United States Patent [19]
Henseler et al.

[11] Patent Number: 5,205,583
[45] Date of Patent: Apr. 27, 1993

[54] INFLATABLE AIRBAG

[75] Inventors: Wolfgang Henseler, Tübingen; Manfred Müller, Deizisau, both of Fed. Rep. of Germany

[73] Assignee: Mercedes-Benz AG, Fed. Rep. of Germany

[21] Appl. No.: 905,181

[22] Filed: Jun. 26, 1992

Related U.S. Application Data

[63] Continuation of Ser. No. 672,425, Mar. 20, 1991, abandoned.

[30] Foreign Application Priority Data

Apr. 4, 1990 [DE] Fed. Rep. of Germany ....... 4010796

[51] Int. Cl.$^5$ ............................................. B60R 21/16
[52] U.S. Cl. ................................................. 280/743
[58] Field of Search ................ 280/743, 729, 732, 728

[56] References Cited

U.S. PATENT DOCUMENTS

| | | | |
|---|---|---|---|
| 3,761,111 | 9/1973 | Kemper | 280/729 |
| 3,807,754 | 4/1974 | Rodenbach et al. | 280/743 |
| 4,004,827 | 1/1977 | Kondo et al. | 280/742 |
| 4,213,634 | 7/1980 | Hoshino et al. | 280/728 |
| 4,944,527 | 7/1990 | Bishop et al. | 280/743 X |
| 4,964,654 | 10/1990 | Bishop et al. | 280/743 |
| 5,094,476 | 3/1992 | Chihaya | 280/743 |

FOREIGN PATENT DOCUMENTS 2552815 5/1977 Fed. Rep. of Germany.
1340549 12/1973 United Kingdom.

Primary Examiner—Tamara L. Graysay
Attorney, Agent, or Firm—Evenson, McKeown, Edwards & Lenahan

[57] ABSTRACT

An inflatable airbag to protect the occupants of a vehicle from an impact on parts in the vehicle passenger compartment is constructed such that a joining seam of two fabric ends of the airbag is provided in the vicinity of an opening made in the bag fabric. The fabric ends are overlapped to such a degree that together they form the complete edge region around the opening and the opening itself.

7 Claims, 1 Drawing Sheet

INFLATABLE AIRBAG

This is a file Wrapper continuation of application Ser. No. 07/672,425, filed Mar. 20, 1991 abandoned.

BACKGROUND AND SUMMARY OF THE INVENTION

The invention relates to an inflatable airbag, and more particularly, to an airbag for a vehicle, wherein a joining seam of two fabric ends of the airbag is provided in the vicinity of an opening in the bag fabric such that the fabric ends are overlapped and together form the complete edge region with the opening.

German Offenlegungsschrift 25 52 815, describes an inflatable airbag for the passenger compartment of a motor vehicle. There, the bag fabric is fastened together by joining the edges to form an airbag. The airbag has an opening for connection to a gas generator which is surrounded by an additional strengthening fabric joined to the airbag. Furthermore, the joining seams on the inside of the airbag are also bridged with vulcanized-on or stuck-on fabric strips. Such an arrangement is not particularly favorable from a manufacturing point of view.

An object of the present invention is to protect an opening formed in an airbag against load damage in a manner which is particularly favorable for manufacturing.

The foregoing object has been achieved according to the present invention by providing the joining seam in the vicinity of the opening. The fabric ends are overlapped to form together the complete edge region with the opening.

The openings and their surroundings in an airbag are heavily loaded by the gas pressure forces during inflation and by the hot filling gases, and must therefore be additionally reinforced with respect to the bag fabric.

The need for an added reinforcing fabric piece in the airbag can be avoided by overlapping two fabric ends so that together the ends form the complete edge region and the opening of the airbag.

In this arrangement, the initial cut of the bag fabric can already contain two openings which are congruent after the overlapping of the fabric ends, or else the opening is made in the overlapped region after the joining together of the two fabric ends.

If the two overlapping fabric ends are joined once more by an additional fastening seam which is arranged in the same direction as the joining seam on the opposite side of the opening, or if the two fabric ends are joined to one another in a plane fashion, the edge region which is heavily loaded by pressure forces or temperatures is given a high degree of protection against tearing open of the opening edges. At the same time, this also supports the actual joining seam of the fabric ends.

BRIEF DESCRIPTION OF THE DRAWINGS

These and other features, objects and advantages of the present invention will become more apparent from the following detailed description of a presently preferred embodiment when taken in conjunction with the accompanying drawings wherein.

DETAILED DESCRIPTION OF THE DRAWINGS

Figure 1:
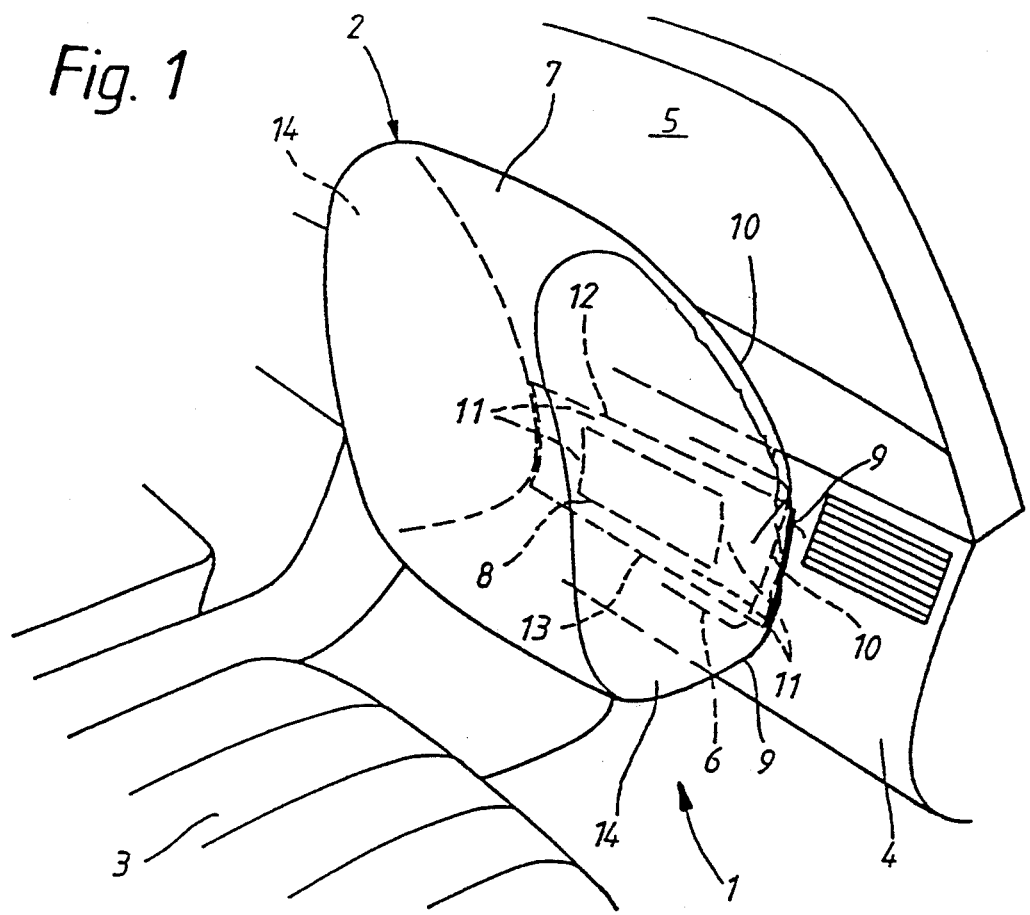
FIG. 1 is a perspective view of a vehicle passenger compartment with an inflated airbag in accordance with the present invention.

In FIG. 1, a vehicle passenger compartment 1 of a motor vehicle is illustrated in which an airbag 2 lies inflated between a vehicle occupant (not illustrated) on a front passenger seat 3 and a dashboard 4 with the adjoining windshield 5. This view illustrates the situation after the vehicle has had an accident in which a crash sensor activates a gas generator (not shown in detail) which fills the airbag 2, which is initially folded into a compartment 6 in the dashboard 4, with gas. As a result, the bag pushes away a compartment cover and emerges from the compartment 6 and inflates in front of the vehicle occupant in a protective fashion.

In a region accommodated in the compartment 6 the airbag 2 has an opening 8 made in the bag fabric 7 constituting the outer cover part for connecting the gas generator or a gas generator casing.

Figure 3:
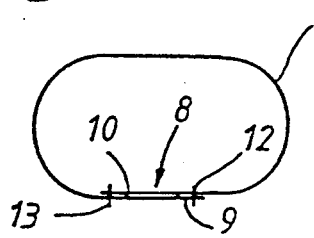
FIGS. 3a and 3b are reduced-scale illustrations of the outer cover initial cut shown in FIG. 2, but in the joined state.
Figure 3:
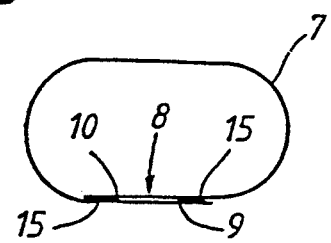

The outer cover of the airbag 2 is constructed such that its two fabric ends 9 and 10 overlap to such a degree that together they form the complete edge region 11 of the formed-in opening 8 and the opening itself. Accordingly, the edge region 11 of the opening 8 is therefore double-layered and thus better withstands the loading by the pressure forces and by the temperatures of the gas generator. In addition to the joining seam 12 of the two fabric ends of 9, 10, it is advantageous to provide a fastening seam 13 which is arranged as shown in FIG. 3a in the same direction as the joining seam 12 on the opposite side of the opening 8, or else to fix as shown in FIG. 3b the fabric ends 9, 10 to one another in a plane manner, for example with an adhesive material 15.

Figure 2:
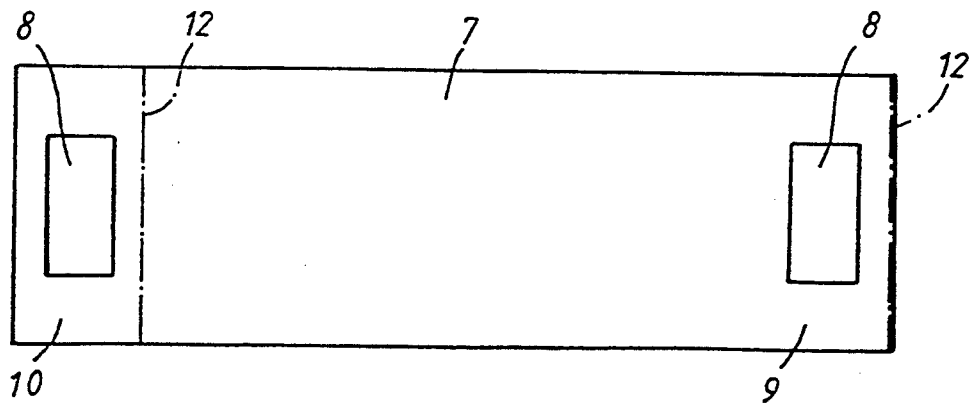
FIG. 2 is a plan view of an initial cut of the outer cover of the bag fabric of the airbag.

As is shown in FIG. 2, it is readily possible to provide an opening 8 in each fabric end 9, 10. The openings 8 are designed to overlap one another, after which the joining seam 12 is closed. After the completion of this airbag fabric 7 with the side parts 14, a complete airbag 2 with a double-layered, reinforced edge region 11 around the opening 8 is formed.

This reinforcement of the edge region is, of course, possible for each opening in the airbag in whose vicinity a joining seam of the bag fabric runs or can be arranged.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An inflatable airbag to protect the occupants of a vehicle from an impact on parts in the vehicle passenger compartment, comprising a bag fabric having at one end thereof a first opening whose complete edge region is reinforced by another end of the bag fabric with a second opening mating with the first opening and joined to the one end of the bag fabric to form only a double layer, and joining seams of the two fabric ends of the airbag provided near sides of the openings, wherein the fabric ends are overlapped in the double layer around the openings such that together they form the complete edge region with the openings so as to define an unobstructed aperture for inflating the airbag.

2. The inflatable airbag according to claim 1, wherein the openings are provided at both fabric ends in an initial cut of the bag fabric.

3. The inflatable airbag according to claim 2, wherein the joining seams of the two fabric ends comprise a first joining seam and an additional fastening seam arranged at opposite sides of the openings.

4. The inflatable airbag according to claim 1, wherein the openings are operatively arranged to receive one of a gas generator receptor and a generator casing.

5. The inflatable airbag according to claim 4, wherein the joining seams of the two fabric ends comprise a first joining seam and an additional fastening seam arranged at opposite sides of the openings.

6. The inflatable airbag according to claim 5, wherein the openings and provided at both fabric ends in an initial cut of the bag fabric.

7. The inflatable airbag according to claim 1, where the joining seams of the two fabric ends comprise a first joining seam and an additional fastening seam arranged at opposite sides of the openings.

* * * * *